UNITED STATES PATENT OFFICE.

JAMES G. VAIL, OF CHESTER, PENNSYLVANIA.

PROCESS OF PREPARING A PLASTIC BINDING COMPOSITION.

1,206,056.  Specification of Letters Patent.  Patented Nov. 28, 1916.

No Drawing.   Application filed June 29, 1915.  Serial No. 37,068.

*To all whom it may concern:*

Be it known that I, JAMES G. VAIL, a citizen of the United States, and a resident of Chester, county of Delaware and State of Pennsylvania, have invented certain new and useful Improvements in Processes of Preparing a Plastic Binding Composition, of which the following is a specification.

My invention relates especially to binding materials adapted for use in conjunction with a suitable road metal in the construction of roads, as well as for other purposes where a cheap, water-proof material having strong adhesive as well as somewhat elastic properties is required for the purpose of uniting or cementing together particles of rock, crushed stone, abrasives or other substances.

While it has been recognized that a binding material suitable for the foregoing purposes might be produced by a suitable combination of an alkaline solution of a silicate and a bituminous product, the former contributing to the binding or cementitious quality of the material and the latter to its elastic and water-proof properties, nevertheless, owing probably to the inherently different characteristics of these ingredients, it has been impossible to produce a satisfactory compound thereof which shall be adapted for the purposes intended, and especially one which shall remain stable and in the form of an intimate mixture under varying conditions, and in which the ingredients will not readily separate and assume their primary forms substantially in the same way, though perhaps somewhat more slowly, as a mixture of oil and water will separate.

A principal object of my invention, therefore, is to provide a water-proof binding material containing an alkaline solution of a silicate and a bituminous product, adapted for uniting or cementing together solid particles such as crushed stone or other road metal, abrasives, and the like, which shall be stable under substantially all ordinary conditions, and in which the ingredients will not readily separate; and to provide a binding material of this character which shall set or harden on exposure to the air within a reasonable length of time without the use of artificial means, and which, after setting or hardening, will not tend to wash away but will exert a maximum adhesive effect on particles of crushed stone or the like which may be embedded therein.

Further objects of my invention are to provide a process by which materials having dissimilar natures, as for example, alkaline solutions of silicates and greasy or oily substances such as paraffin or bituminous products, may be combined to produce substantially perfect emulsions which will not readily separate into their constituent ingredients; and to provide a process by which a binding material having the characteristics hereinbefore described may be produced cheaply by workmen of ordinary intelligence without the employment of special apparatus.

My invention further includes all of the other various novel features, operations and objects hereinafter more definitely specified and described.

As I have pointed out, it has hitherto been impossible to obtain a sufficiently intimate and stable mixture of materials such as alkaline solutions of sodium silicate and greasy or oily bituminous substances to produce a satisfactory binding material, for although it has been possible to mechanically mix substances of this nature the resultant product quickly tends to separate, the bituminous material generally rising to the top and the silicate solution settling to the bottom in a manner similar to a mixture of oil and water, although perhaps with less rapidity. I have found, however, that I am able by means of the process hereinafter described, to intimately combine materials of this nature in such a way that without sacrificing any of the valuable properties of the ingredients, the resultant product shall be stable under substantially all ordinary conditions and will not separate into its constituent ingredients, but, on the contrary, forms a composition suitable for use as a binding material and for other purposes as hereinbefore described, and which may further be manufactured where desired, kept in suitable containers for any desired period, and transported to the place where it is intended to be used without in any way changing its character or impairing its properties.

While in the production of my improved binding material I may make use of various ingredients having the characteristics of alkaline silicate solutions and suitable greasy or oily substances, excluding, however, from the latter such oily or greasy substances as tend to saponify, I prefer, especially where the binding material is intended for use in road building or the like to employ an alkaline solution of sodium silicate and a suitable bituminous product such as asphalt, tar or pitch. All of these materials are somewhat viscous in their nature but in different degrees, and I have found that if the natural viscosities of the two or more substances which it is desired to combine to produce the resultant composition or binding material be first changed by suitable means so that they shall be approximately equal in degree, a mixture of the substances thereafter will produce a substantially perfect emulsion, which will not tend to separate into its constituent ingredients.

In practice and for the purpose of accomplishing this result, it is generally necessary to reduce the viscosity of the bituminous product employed, and for this purpose any suitable means may be adopted. I find, however, that good results may be obtained by reducing the viscosity of the asphalt, pitch or other bituminous product by means of a suitable solvent, preferably kerosene or the like, or by heat, a sufficient amount of the solvent being utilized to reduce the viscosity of the asphalt or other material to substantially that of the silicate solution with which it is to be mixed. It will be evident that if a silicate solution, for instance an alkaline solution of sodium silicate, of relatively great viscosity is to be employed, no difficulty will be experienced in reducing the viscosity of the bituminous material to substantially that of the silicate solution, but the binding material formed by the employment of such a solution sets or hardens extremely slowly, and in fact frequently requires the employment of artificial means, such as heat or the like, to cause it to set at all, thus precluding its use on a large scale as a binding material in road construction and the like, for which purpose it is also unadapted commercially by reason of the relatively high initial cost of the concentrated silicate solution. However, binding material comprising such a concentrated silicate solution is well adapted for use in certain of the arts, for instance in the formation of abrasive wheels and the like, where its relatively high cost is not prohibitive to its commercial employment, and where suitable artificial means to cause the binding material to set, such as the baking of the wheel in a furnace, may be readily employed.

In the production of a binding material suitable for use in road building and the like, I prefer for the reasons just set forth, to make use of a silicate solution such as an alkaline solution of sodium silicate of a relatively low degree of concentration and of moderate viscosity, the initial cost of such solution being much less than that of the concentrated solution, and its tendency to harden or set being much greater, and to raise the viscosity thereof by the employment of suitable means to approximately that of the bituminous or asphaltic ingredient, the viscosity of which may or may not have been reduced, as hereinbefore described, and then to suitably incorporate the ingredients with each other to produce the binding material. For this purpose I prefer when employing such a solution of sodium or other silicate to mix the same with a suitable filler, preferably stone screenings or the like, prior to its admixture with the bituminous ingredients in order to raise its viscosity to substantially that of the latter. For example, in producing a binding material in accordance with my process and suitable for use in the construction of roads I may employ a suitable quantity of an alkaline solution of sodium silicate of a relatively low degree of concentration, for instance a solution which would test approximately from 35 to 45 degrees Baumé and having a relatively low viscosity, and thoroughly mix therewith a quantity of stone screenings or the like sufficient to raise its viscosity to substantially that of a very thick syrup such as molasses. If necessary, I may then reduce the viscosity of the asphalt or other bituminous material to be employed to a substantially similar point by the use of a suitable solvent, such as kerosene, or even by heating the bituminous material, provided it is of such nature that its viscosity may be sufficiently reduced by the employment of temperatures not materially greater than the boiling point of the silicate solution, namely, 212 degrees Fahrenheit, after which the bituminous material and the thickened silicate solution may be thoroughly mixed together by any suitable means to form the resultant product. This material, as hereinbefore described, approximates a substantially perfect emulsion of the silicate solution and the greasy or oily bituminous substance, is homogeneous, under practically all normal conditions, will not readily separate into its constituent ingredients and, if desired, may be stored in suitable containers and transported from the place of manufacture to the place where it is to be used without in any way changing its character or unfitting it for employment for the purposes intended.

When it is desired to employ the binding material for use in road building or the like, the same may be mixed with a suitable road metal, such as crushed stone, and thereafter laid by any suitable means to form the road surface, exposure to the air for a reasonably short time, as for instance for two or three days, serving to set or harden the material sufficiently to permit of ordinary travel over the road. When so employed the binding material which is water-proof and with but a slight tendency to wash away, serves to firmly unite the particles of crushed stone or other road metal, and also by reason of its inherent elastic properties materially contributes to the durability of the road.

While I have herein described my improved process especially with reference to the production of a suitable binding material for use in road building and the like, it will be evident that it may be readily utilized wherever it is desired to combine materials of different viscosities, one or more of which are of an oily nature and others of a watery or aqueous nature, and that by the use of suitable means to change the natural viscosities of the substances to be mixed and to bring them to substantial similarity a practically perfect emulsion of the substances may be readily made, thus producing a resultant mixture which will not tend to separate under normal and ordinary conditions.

Furthermore, it will be understood that various changes and modifications of the process when utilized in the formation of a binding material suitable for use in road building and the like may be made and that the concentrations, proportions and nature of the substances utilized, as herein set forth by way of example, may be varied in order to produce desired results without departing from the spirit and scope of the invention as defined in the appended claims.

Having thus described my invention, I claim and desire to protect by Letters Patent of the United States:

1. The process of forming an emulsion of an alkaline solution of a silicate and a bituminous product which consists in substantially equalizing the viscosities of the substances and then mixing the substances together.

2. The process of forming a binding material which consists in increasing the viscosity of an alkaline solution of sodium silicate, decreasing the viscosity of a bituminous product and mixing said solution and said product together when their respective viscosities are substantially equal.

3. The process of forming a binding material comprising an alkaline solution of sodium silicate and a bituminous product, which consists in reducing the viscosity of the bituminous product to substantially that of the solution and then mixing said product and said solution together.

4. The process of forming a binding material which consists in increasing the viscosity of a solution of sodium silicate by incorporating stone screenings therein, reducing the viscosity of a bituminous product with a suitable solvent and thereafter mixing said product and said solution together when their respective viscosities are substantially equal.

5. The process of forming a binding material comprising an alkaline solution of a silicate and a bituminous product, which consists in raising the viscosity of the silicate solution to substantially the viscosity of the bituminous product and then mixing said solution and said bituminous product together when in a fluid condition.

In witness whereof, I have hereunto set my hand this 26th day of June, A. D. 1915.

JAMES G. VAIL.

Copies of this patent may be obtained for five cents each, by addressing the "Commissioner of Patents, Washington, D. C."